(12) United States Patent
Pollet et al.

(10) Patent No.: US 6,741,936 B2
(45) Date of Patent: May 25, 2004

(54) THREE-DIMENSIONAL SOUND INTENSITY PREDICTION SYSTEM

(75) Inventors: Dean A. Pollet, Fredericksburg, VA (US); Micheal M. Kordich, Falmouth, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/864,826

(22) Filed: May 24, 2001

(65) Prior Publication Data

US 2003/0208344 A1 Nov. 6, 2003

(51) Int. Cl.[7] ................................................ G01W 1/00
(52) U.S. Cl. ........................................ 702/3; 73/170.28
(58) Field of Search ..................... 702/3, 2; 73/170.16, 73/35.14, 170.28; 181/116, 125, 139, 142, 143

(56) References Cited

U.S. PATENT DOCUMENTS 5,079,749 A * 1/1992 Aminzadeh et al. .......... 367/73

OTHER PUBLICATIONS

"Ground and Meteorological Effects on Sound Propagation in the Atmosphere– Predictions and Measurements", Lam, Apr. 4, 2000, International Journal of Acoustics and Vibration, vol. 5, No. 3, pp. 135–139.*

"Instrumentation of the Rocket–Grenade Experiment for Measuring Atmospheric Temperatures and Winds", Stroud et al., May 1955, review of Scientific Instruments, vol. 26, No. 5, pp. 427–432.*

"Coupled Simulation of Meteorological Parameters and Sound Level in a Narrow Valley", Heimann et al., Applied Acoustic 56, 1999.*

"Instrumentation of the Rocket–Grenade Experiment for Measuring Atmospheric Temperatures and Winds", Stroud et al., May 1955, Review of Scientific Instruments, vol. 26, No. 5, pp. 427–432.*

Micheal M. Kordich et al, Sound Intensity Prediction System (SIPS); User's Guide as Installed at Utah Test and Training Range Hill Air Force Base (UTTER), May 2000, Report #NSWCDD/TR–00/53.

Micheal M. Kordich et al, Sound Prediction System (SIPS): Volune 1–Reference Manual, Dec. 1997, Report #NSWCDD/TR–97/144.

Robert J. Thompson, Ray Theory for an Inhomogeneous Moving Medium, The Journal of the Acoustical Society of America, 1973, vol., 51, pp. 1675–1682.

* cited by examiner

Primary Examiner—John Barlow
Assistant Examiner—Toan M Le
(74) Attorney, Agent, or Firm—Matthew J. Bussan, Esq.; James B. Bechtel, Esq.; Raymond J. H. Powell, Jr., Esq.

(57) ABSTRACT

A sound intensity prediction system predicts the sound intensity created from a noise event and determines, on a three-dimensional basis taking into account cross winds and a moving noise source, the concentration of acoustic ray end points on land to indicate areas of noise intensification zones and where acoustic rays never touch down to indicate areas of quiet.

10 Claims, 5 Drawing Sheets

THREE-DIMENSIONAL SOUND INTENSITY PREDICTION SYSTEM

ORIGIN OF THE INVENTION

The invention described herein was made by employees of the United States Government and may be used by or for the Government for governmental purposes without payment of any royalties thereon or therefor.

SEQUENCE LISTING

The computer program listing appendix defined by a compact disc identified by the file name SIPS3D.TXT is herein incorporated by reference. The file SIPS3D.TXT has a file size of 78.3 kilobytes and a creation date of May 17, 2001.

BACKGROUND OF THE INVENTION

1.0 Field of the Invention

This invention is related to a sound intensity prediction system and, more particularly, to a system that predicts the sound intensity created from a noise event and determines, on a three-dimensional basis taking into account cross winds and a moving noise source, the concentration of acoustic ray end points on land to indicate areas of noise intensification zones and where acoustic rays never touch down to indicate areas of quiet.

2.0 Description of Related Art

Several examples of a Sound Intensity Prediction System (SIPS) are known; one such SIPS is described in reports NSWCCD/TR-00/53 and NSWCDD 1TR-97/144. The SIPS described in these reports uses an acoustic ray tracing computer techniques to determine the locations of both noise enhancements and noise reductions related to noise events, such as explosive operations.

The SIPS serves as a noise-complaint management tool that takes into account the annoyance from a single noise event with respect to both the characteristics of the noise itself and on the community's perception of the noise. Characteristics of the noise include: the intensity of the noise; its spectral characteristics; duration of the sound; the number of repetitions; the abruptness of onset or cessation; and background noise when a particular noise event occurs. Social surveys have found that community perception is driven by factors including: the degree of interference of the noise with activity; previous experience of the community with the particular noise; the time of day that the intruding noise occurs; fear of personal danger associated with the activities of the noise sources; socioeconomic status and education level of the community; and the extent the people believe that the noise output could be controlled.

The core of the SIPS described in the above-identified reports is a computer program that is based on a two-dimensional (2D) description of the atmosphere and topography. The two-dimensional SIPS utilize acoustic rays and the paths thereof in its prediction. Acoustic rays are mathematically traced in many directions around a sound source and are compiled into a map showing where the noise is likely to be distributed, its maximum levels, and its quiet zones. The prediction is then used to either proceed with an explosive event if quiet zones are predicted, or postponed if the two-dimensional SIPS show that the noise may impinge on a sensitive community and lead to complaints.

The two-dimensional SIPS includes hardware involved in not only the operation of the computer used in the prediction, but also in meteorological data collection system. As near as possible in both place and time to the explosive site, a RADIOSONDE is typically lofted by a weather balloon to gather temperatures, and wind speeds and directions at various altitudes. These three parameters versus altitude are input to the SIPS to make the predictions. The other source of input to the two-dimensional SIPS is a topographical description extracted from Level 1, Digital Terrain Elevation Data (DTED) produced by the National Imagery and Mapping Agency in Fairfax, Va.

The two-dimensional SIPS has served well its intended purpose. The predictions made by the two-dimensional SIPS have been accurate enough to allow a major disposal facility to avoid complaints from a number of noise events, e.g., explosion events. In spite of these successful operations, it is desired that further improvements be provided.

One drawback is that the two-dimensional SIPS considers the sound source, that is, the noise event, as having a stationary origin, which presents limitations in its usefulness. It is desired that a Sound Intensity Prediction System be provided that accommodates both stationary and moving sound sources.

Another drawback is that the topographical description input into the two-dimensional SIPS needs to consist of radial lines produced for each azimuth of interest related to the site of the noise event and needs to be produced from DTED prior to using the two-dimensional SIPS. It is desired that a SIPS be provided that uses the input topography description directly without the need for prior handling by the SIPS.

A further drawback is that the two-dimensional SIPS needs to simulate the atmosphere as a vertical sheet for each azimuth of interest related to the site of the noise event with all ray tracings remaining in that plane. The effects of cross winds can not be addressed with this technique. It is desired that a SIPS be provided that takes into account the effects of cross winds in its prediction.

Furthermore, one more drawback is that the two-dimensional SIPS can simulate sound reflections from ground surfaces in only a limited way since the reflected rays must also remain in the plane of interest. This limitation is relatively important since, under certain conditions, echoes may be responsible for very distant sound propagation in mountainous areas. It is desired that a SIPS be provided that can trace acoustic rays in all directions.

OBJECTS OF THE INVENTION

It is an object of the present invention to provide a Sound Intensity Prediction System (SIPS) that accommodates stationary and moving sound sources related to a noise event.

It is another object of the present invention to provide a SIPS that effectively utilizes topography descriptions directly.

It is a further object of the present invention to provide a SIPS that takes into account the effects of cross winds in its prediction.

Moreover, it is an object of the present invention to provide a SIPS that traces acoustic rays created by a noise event in all directions.

SUMMARY OF THE INVENTION

The invention is directed to a Sound Intensity Prediction System (SIPS) employing three-dimensional acoustic ray tracing techniques that take into account cross wind effects and handles stationary and/or moving sound sources serving as a noise event.

In one embodiment, a method for predicting is provided for determining the location of noise intensification zones and quiet zones created by a noise event emanating from a site of interest and generating acoustic rays. The method includes steps for providing a processor and inputting to the processor meteorological data collected at upper atmospheric layers over the site of interest. The meteorological data include temperatures, wind speeds and wind directions at the altitude of each of the atmospheric layers. The method further includes inputting a topographical description of the site of interest to the processor and providing a program for being run in the processor for tracing and calculating the acoustic ray paths through each atmospheric layer as a function of the altitude and taking into account the cross wind effect on the acoustic rays at each atmospheric layer.

DETAILED DESCRIPTIONS OF THE PREFERRED EMBODIMENTS

Figure 1:
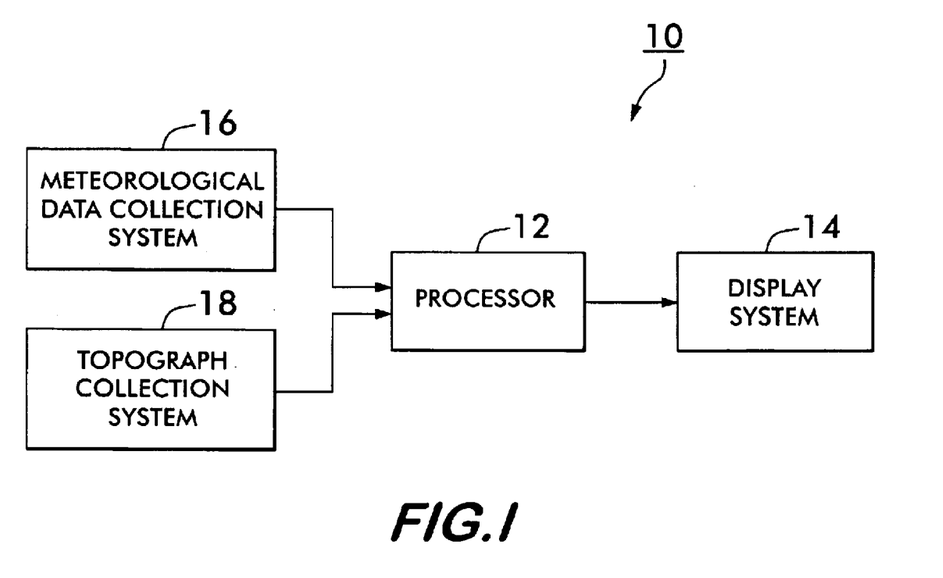
FIG. 1 is a block diagram of the present invention.

Referring to the drawings wherein the same reference number indicates the same element throughout, FIG. 1 illustrates a block diagram of the three-dimensional Sound Intensity Prediction System 10, which advantageously includes a processor 12, a display system 14, a meteorological data collection system 16, and a topographical collection system 18. The three-dimensional Sound Intensity Prediction System (SIPS) 10 predicts the intensity of sound and associated zones thereof created by a noise event that generates acoustic rays at a site interest.

The meteorological data collection system 16 monitors atmospheric conditions and may employ either radiosondes or Sonic Detection And Ranging Device (SODAR) technology to collect the upper air parameters, that is, the air parameters of the atmospheric layers over the site of interest. Radiosondes are carried aloft by helium-filled balloons so that the scalar quantities of wet and dry bulb temperatures, as well as atmospheric pressure can be retrieved. Since the balloon rides along with the wind, systems such as radio-navigation LORAN-C or Global Positioning System (GPS) are commonly employed to determine the balloon's location as a function of time and subsequently record the upper air wind speed and directions as a function of altitude. SODAR has an advantage over other collection systems by taking less time between atmosphere soundings and recording and characterizes the atmosphere directly above the site of interest, rather than at the balloon's location.

The topographical description is preferably Digital Terrain Elevation Data (DTED) supplied by the National Imagery and Mapping Agency. Unlike the two (2) dimensional Sound Intensity Prediction System discussed in the "Background" section that requires radial lines-of-sight (LOS), the three (3) dimensional Prediction System 10 of the present invention can use the grid provided by the DTED as is, i.e., without any pre-use processing.

The processor 12 receives meteorological data from the system 16 while the processor 12 also receives a description of the topography of the site of interest from system 18. The processor 12 provides the tracing and calculations of the propagation of the acoustic waves through each atmospheric layer as a function of the altitude while taking into account the cross wind effect on the acoustic rays at each acoustic layer. Display system 14 is serviced by the processor 12 so as to display a map of the areas surrounding the site of interest showing the location of sound concentration and quiet areas to be described.

The SIPS 10 serves as a noise-compliant management tool that helps control the impact of noise created from a noise event, such as, explosive operations, on surrounding communities. In general, the upper-level meteorological data gathered by the system 10 near the origin of the explosive site, or ground site location, is input to the processor 12, which predicts where and how the atmosphere propagates the resulting sound. If there is prediction of greatly reduced sound or a fraction to an area where it will not effect the community, a decision to continue the operation is in order. Predictions of sound intesification near populated areas may indicate a postponement of the activities until the weather changes. The overall operation 20 of the present invention may be described with reference to FIG. 2 that comprises a plurality of program segments given on Table 1.

TABLE 1

Figure 2:
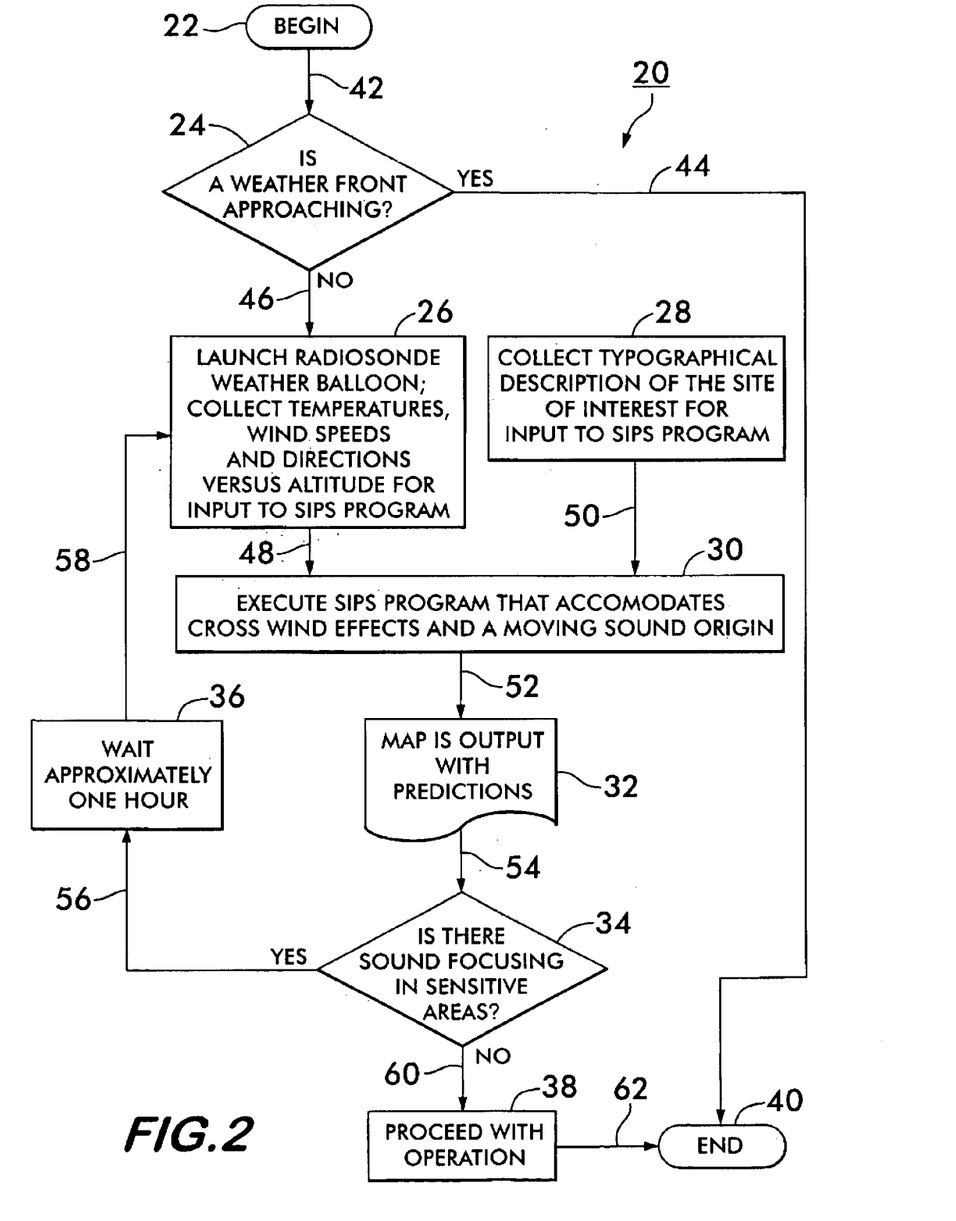
FIG. 2 illustrates the overall operation of the present invention.

| REFERENCE NUMBER | PROGRAM SEGMENT |
|---|---|
| 22 | Begin |
| 24 | Is a weather front approaching? |
| 26 | Launch RADIOSONDE weather balloon; collect temperatures, wind speeds and directions versus altitude for input to SIPS program |
| 28 | Collect topographical description of the site of interest for input to SIPS program |
| 30 | Execute SIPS program that accommodates cross wind effects and a moving sound origin |
| 32 | Map in outputted with predictions |
| 34 | Is there sound focusing in sensitive areas? |
| 36 | Wait approximately one hour |
| 38 | Proceed with operation |
| 40 | End |

The overall operation is initiated with the event 22 that activates program segment 24 by way of signal path 42. Program segment 24 is a decisional process to determine if a weather front is approaching; if a weather front is approaching the output of program segment 24 is routed via signal path 44 to program segment 40, which terminates the operations of the present invention. However, if a weather front is not approaching, program segment 24 notifies program segment 26 by way of signal path 46.

Program segment 26 causes the launching of RADIOSCONE weather balloon associated with the meteorological data collection system 16 so as to collect temperatures, wind speeds and directions versus altitude and inputs the collected data to the processor 12 and, more particularly, to the SIPS program, to be further described hereinafter, being run in the processor 12. The execution of the SIPS program is represented in FIG. 2 by program segment 30 and receives the information from program 26 by way of signal path 48, as well as receives information from program segment 28 by way of signal path 50.

Program segment 28 represents the collection of the topographical description of the site of interest provided by the topographical description system 18 and input to the SIPS program.

Program segment 30 represents the execution of the SIPS program, which is of particular importance to the present invention because it provides predictions that accommodate for cross wind effect and for handling a moving sound source origin, or a stationary sound source, both to be further described hereinafter. The output of the program segment 30 is routed to program segment 32 by way of signal path 52.

Program segment 32 provides for the generation of a map illustrating the sound predictions related to the site of interest. These predictions are analyzed and the result of such predictions are provided to program segment 34 by way of signal path 54.

Program segment 34 ascertains whether the sound concentrations or focusing of the sound are associated with sensitive areas that would cause difficulty for the community and if that determination is made (yes), then that decision is routed via signal path 56 to program segment 36.

Program segment 36 waits for approximately one hour and re-initiates the process again, i.e., activating program segment 26 by way of signal path 58.

If the decision of program segment 34 provides for a compliance situation, so that the explosive event may occur, then the operation is allowed to proceed via signal path 60 routed to program segment 38.

Program segment 38 proceeds with the operation and upon its completion terminates the operation (program segment 40 (end)) via signal path 62.

The computer segment 30 is of importance to the present invention and uses ray tracing of the propagation of the acoustic energy that is to be created by the acoustic rays created by noise event passing through the layers of atmosphere over the site of interest.

The acoustic rays created by the noise event are mathematically traced by the SIPS program 64, to be further described with reference to FIGS. 3, 4, and 5, in many directions around a sound source, that is, the noise event, and compiled into a map by program segment 32 showing where the noise is likely to be distributed, its maximum levels, and its quiet zones. The prediction provided by SIPS 10 and, more particularly, SIPS program 64, is then used to either proceed with an explosive event if quiet is predicted, or postpone the event when SIPS 10 shows that the noise may impinge on a sensitive community and led to complaints.

The SIPS program 64 uses a fully three-dimensional (3D) sound propagation model without the approximations inherent in other models that assume a moving medium is part of Snell's law, such as the prior art SIPS described in the "Background" section. The equations used in the SIPS program 64 are given in the technical article entitled "Ray Theory for an Inhomogeneous Moving Medium," by R. J. Thompson, published in *The Journal of the Acoustical Society of America* (1972), Vol. 51, PP. 1675–1682, and herein incorporated by reference. The fundamental equations of hydrodynamics are the starting point for a system of first-order differential equations describing the acoustic ray paths in the atmospheric layers. In the case where the atmospheric parameters of the associated layers are linearly varying in the vertical direction, the ray path segments, or arcs, through each atmospheric layer are defined by integrals with closed-form solutions. These integrals are commonly found published in tables such as those given in the *Chemical Rubber Company (CRC) Standard Mathematical Tables*, $28^{th}$ Edition, by William H. Beyer, CRC Press, and are used in the coding of the SIPS program 64 preferably written in the FORTRAN language.

The SIPS program 64 does not suffer the same constraints that limit the computer programs utilized by prior art SIPS discussed in the "Background" section. One of those drawbacks is that the prior art handles the noise event originating from a stationary sound source. Conversely, the SIPS program 64 uses the DTED description of the topographical site of interest directly to accommodate a moving sound source. Furthermore, the prior art SIPS can simulate sound reflections from ground surfaces in only a limited way since the reflected rays must also remain in the plane of the site of interest. Unlike the prior art, the SIPS program 64 can trace rays in any direction. This last feature of the SIPS program 64 is important since it has been noted that, under certain conditions, echoes may be responsible for very distant sound propagation in mountainous areas.

As mentioned above, the equations used in SIPS program 64 to calculate the acoustic ray paths through a stratified atmosphere are derived in the reference "Ray Theory for an Inhomogeneous Moving Medium," by R. J. Thompson. Rays are traced in a three-dimensional (X,Y,Z) space where the endpoints are determined at the interface of each atmospheric layer, or at the minimum or maximum height if a ray turned within a layer. Unlike the prior art two (2) dimensional SIPS, the SIPS program 64 allows for the effects of cross winds on the ray paths, and the accurate representation of reflections from topographical surfaces.

Beginning at the sound source position $(X_1,Y_1,Z_1)$ and time, $T_1$, a ray is traced either to the layer above or the layer below depending on the initial angle of elevation. Three integrals are solved to provide the location of the endpoint $(X_2,Y_2,Z_2)$ and the time of arrival $T_2$; no solution is needed for $Z_2$, the altitude of the next layer interface, since it is the independent variable. The displacement of the ray endpoint and time of travel in a particular atmospheric layer are given by expressions (1), (2), and (3).

$$X = +/- \int_{Z_1}^{Z_2} \frac{U(1 - Uk_1 - Vk_2) + c^2 k_1}{c[(1 - Uk_1 - Vk_2)^2 - c^2(k_1^2 + k_2^2)]^{1/2}} dz \quad (1)$$

$$Y = +/- \int_{Z_1}^{Z_2} \frac{V(1 - Uk_1 - Vk_2) + c^2 k_2}{c[(1 - Uk_1 - Vk_2)^2 - c^2(k_1^2 + k_2^2)]^{1/2}} dz \quad (2)$$

$$T = +/- \int_{Z_1}^{Z_2} \frac{1 - Uk_1 - Vk_2}{c[(1 - Uk_1 - Vk_2)^2 - c^2(k_1^2 + k_2^2)]^{1/2}} dz \quad (3)$$

The plus/minus signs before the integrals indicate whether the ray is going up or down, respectively. X, Y, and T are then added to the cumulative path of the ray: $X_2=X_1+X$, $Y_2=Y_1+Y$, and $T_2=T_1+T$. To traverse the next layer, the variables are reset to $(X_1,Y_1,Z_1)=(X_2,Y_2,Z_2)$, and $T_1=T_2$.

On occasion, the ray does not reach the next layer but turns back up or down because of atmospheric conditions. The following equation provides the altitude of the turn, $Z_{TP}$ of expression (4), which is then used as one limit for the integrals:

$$Z_{TP} = \frac{1 - U_0 k_1 - V_0 k_2 - c_0(k_1^2 + k_2^2)^{1/2}}{m_u k_1 + m_v k_2 + m_c(k_1^2 + k_2^2)^{1/2}} \quad (4)$$

In the (X,Y,Z) reference system it is convenient to treat U as the east-west component of wind, and V as the north-south component; c is the speed of sound, all being a linear function of Z: $U=m_u Z+U_0$; $V=m_v Z+V_0$, and $c=m_c Z+c_0$. It should be noted that $m_u$, $m_v$, and $m_c$ are the gradients (slopes) for U, V, and c inside the layer of interest. $U_0$, $V_0$, and $c_0$ are the values of the functions at Z=0; another name for them commonly used in the art is the U-, V-, or c-axis intercepts. There is a trio of equations for each atmospheric layer. The integrals have closed-form solutions because U, V, and c are linear functions of Z. Wind speed and direction are measured values, but speed of sound for each layer interface must be calculated from the measured temperatures. Given that $t_i$ is the temperature in degrees Celsius at the bottom of layer i, the sound speed there in feet per second is calculated by expression (5):

$$c_i = 1088\sqrt{1+t_i/273} \quad (5)$$

The unique parameters $(k_1, k_2)$ for each ray path are determined by the initial azimuth and elevation angles. To calculate $(k_1, k_2)$, the original (x,y,z) north-south system is rotated around the z-axis to create the (X,Y,Z) coordinate system used in the previous calculations. The rotation causes the wind vector at the sound source height (h) to be oriented along the new X-axis; there is then no component along the Y-axis at altitude h. This arrangement used in the practice of the present invention greatly simplifies the derivation of expressions for $(k_1, k_2)$. The wind speed and sound speed at Z=h are represented by $W_h$ and $C_h$, respectively. A spherical coordinate system is defined at the origin so that each ray path can be initiated with two angles of departure, phi ($\phi$) measured positive down on the Z-axis at h, and theta ($\theta$) measured positive counterclockwise from the X-axis in the X-Y plane. In summary, each new ray path is chosen by selecting an initial elevation and azimuth $(\phi,\theta)$ pair to determine the parameters $k_1$ and $k_2$ given by expressions (6) and (7):

$$k_1 = \frac{\sin\varphi\cos\theta}{d} - \frac{W_h}{d^2 + W_h d\sin\varphi\cos\theta} \quad (6)$$

$$k_2 = \frac{\sin\varphi\sin\theta}{d}, \text{ where } d = (W_h^2\sin^2\varphi\cos^2\theta + C_h^2 - W_h^2)^{1/2} \quad (7)$$

The coordinate system can later be rotated back to provide the locations of the ray path endpoints in the original system for comparisons with the topography definition.

A topography description of the terrain around the sound source is provided in the form of a rectangular array of (x,y,z) points in the original north-south reference system. A location on the ground (x,y) is linked with a corresponding height above mean sea level z. The array defines a surface composed of triangular facets. The incoming acoustic rays are checked for intersections with the topography facets in its vicinity. The intersection point is found by numerical approximation techniques rather than solved by a closed-form solution. If a ray terminates on a topographical surface, it will be reflected back into the atmosphere. The process will continue until the ray leaves the defined area. The final results of the calculations will be an array of endpoints and times of arrival. An algorithm, known in the art, using the endpoint separations and times of arrival selects those that represent areas of sound intensification.

In the SIPS program 64 the acoustic rays are allowed to reflect from topography facets that are encountered to simulate the real reflection of low-frequency sound from water or ground surfaces. New values $(k_1, k_2)$ will be recomputed because the ray will now be treated as beginning from an altitude different from the original Z=h with a new set of initial angles $(\phi,\theta)$. The process of reflection will entail another coordinate rotation until the ray is either reflected again or terminated. The next ray will revert to calculations inside the (X,Y,Z) system.

The SIPS program 64 may be further described with reference to FIGS. 3, 4, and 5 that cumulatively represent the flow chart of SIPS program 64 and that comprise program segments respectively shown in Tables 2, 3, and 4.

TABLE 2

| Reference Number | Program Segment |
| --- | --- |
| 66 | SIPS 3D |
| 68 | Input meteorological data collected at upper atmospheric layers over the site of interest |
| 70 | Input coordinates for topographical description of site of interest |
| 72 | Calculate the speed of sound in each upper level of the meteorological data |
| 74 | Rotate coordinate system such that wind vector at sound source altitude is aligned along the rotated x-axis |
| 76 | Calculate east-west (x) and north-south (y) components of wind speed at each level in the rotated coordinate system |
| 78 | Calculate the sound speed and wind component gradients within each atmospheric layer; maintain during program execution |
| 80 | Initialize the azimuth angle to begin new ray path |
| 82 | Initialize the elevation angle to begin the new ray path |
| 84 | Calculate unique parameters $k_1$, $k_2$ for the acoustic ray being traced |
| 86 | Set ray path origin (X1,Y1,Z1) at the sound source; set time (T1) = 0 |
| 114 | Increment to the next azimuth angle |
| 116 | Increment to the next elevation angle |

TABLE 3

| Reference Number | Program Segment |
| --- | --- |
| 88 | Select altitude, of ray path endpoint in current atmospheric layer, depending if ray is traveling up, down, or turning within the layer |
| 90 | Does the sound ray exit the top of the defined atmosphere? |
| 92 | Calculate the endpoint of the ray path in the current atmospheric layer; (X2,Y2,Z2) and time, T2 |
| 94 | Does the ray path intersect with the plane of the topography? |
| 96 | Is the ray beyond the topography definition? |
| 108 | Record the location of the intersection (Xt,Yt,Zt) and time of arrival Ta |
| 110 | Calculate parameters needed for ray reflection from a topographical surface |
| 112 | Initialize the beginning of the next ray path segment to the last endpoint: (X1,Y1,Z1 ) = X2,Y2,Z2) |

TABLE 4

| Reference Number | Program Segment |
| --- | --- |
| 98 | Are the elevation angles for the azimuth of interest exhausted? |
| 100 | Are the azimuth angles of interest exhausted? |
| 102 | Calculate overpressures for the sound intensification's indicated by the ray path endpoints and times of arrival |
| 104 | Output map featuring topographic excursions and sound intensification areas |
| 106 | End |

Figure 3:
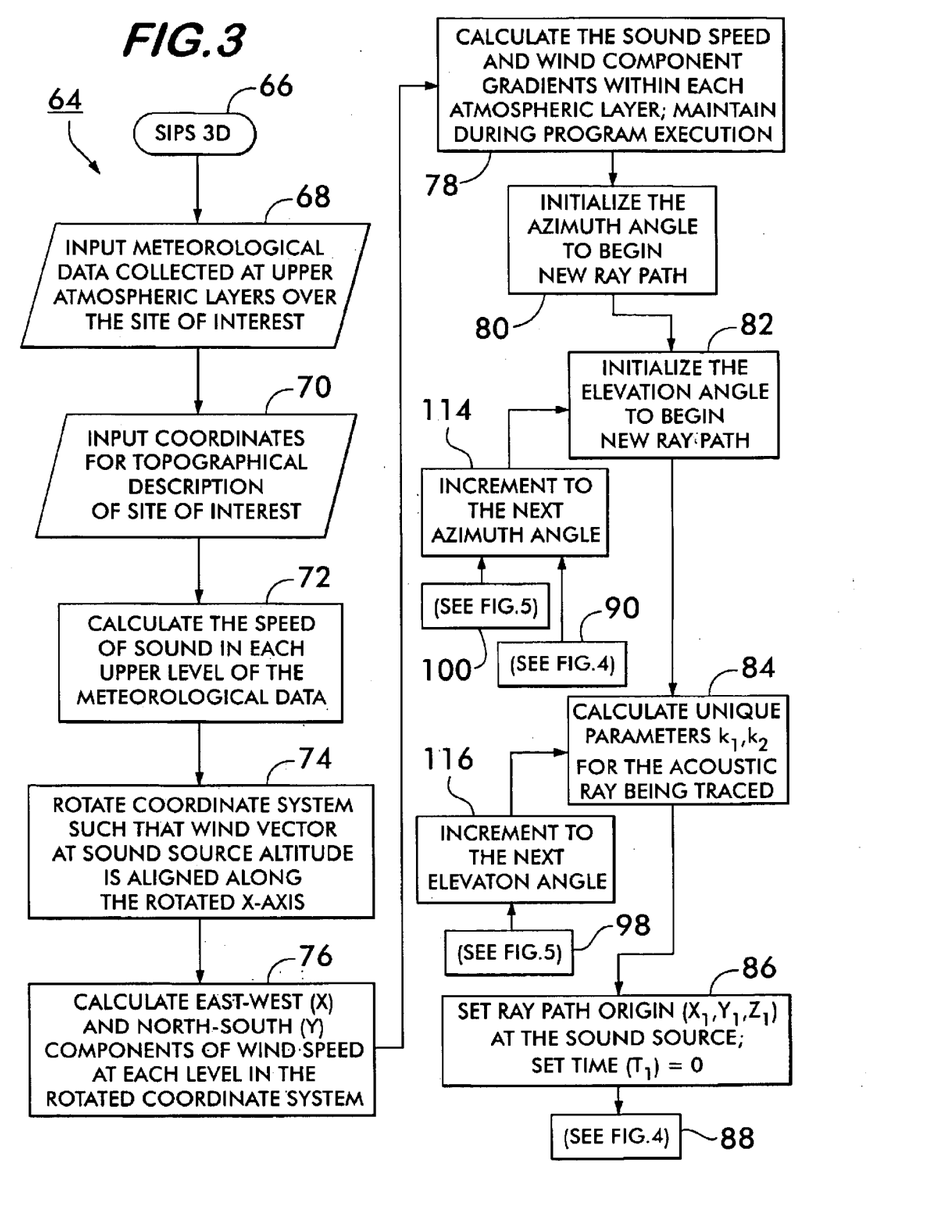
FIGS. 3, 4, and 5 cumulatively represent a flow chart of the operation of the present invention.

With reference to FIG. 3, the SIPS program 64 is initiated by event 66 (SIPS 3D) causing the meteorological data collected by the collection system 16 of FIG. 1 to be input to the program segment 64. This meteorological data consists of the upper atmospheric layers over the site of interest and is used for calculating the paths of the acoustic rays created by the noise event, which is typically an explosion. Event 66 also causes the topographical description gathered by the collection system 18 of FIG. 1 to be input to the SIPS program 64. Topographical data comprises the coordinates for the description of the site of interest and is used for calculating the plane of the topography.

After program segments 68 and 70 are completed, program segment 72 calculates the speed of sound in each of the upper layers of the meteorological data in a manner known in the art. Wind speed and direction are measured values, but speed of sound for each layer interface needs to be calculated from the measured temperatures. Given that $t_i$ is the temperature in degrees Celsius at the bottom of layer i, the sound speed in the layer, in feet per second is calculated by expression (8):

$$c_i = 1088\sqrt{1+t_i/273} \tag{8}$$

Upon completion of program segment 72, program segment 74 is initiated and rotates, in a manner known in the art, the coordinate system used for calculating the path of acoustic rays, so that the wind vector at the sound source, e.g., the noise event, altitude is aligned along the rotated X-axis.

Next, the SIPS program 64, by way of program segment 76, calculates the east-west (x) and north-south (y) components of wind speed at each atmospheric layer in the rotated coordinate system. Upon completion of program segment 76, program segment 78 is initiated and calculates, in a manner known in the art, the sound speed and the wind component gradients within each atmospheric layer and maintains such gradients throughout the execution of SIPS program 64.

The SIPS program 64 then, by way of program segments 80 and 82, respectively, initializes the azimuth and elevation angles to begin the acoustic path tracing of the acoustic rays possibly created by the noise event being predicted. Upon completion of program segments 80 and 82, program segment 84 is initiated.

Program segment 84 calculates, in a manner as previously described, the unique parameters $k_1$ and $k_2$ for the acoustic ray being traced. Upon completion of the program segment 84, program segment 86 is initiated which sets the ray path origin $(X_1,Y_1,Z_1)$ at the source sound and set timed $(T_1)$=0 and then program segment 88 shown in FIG. 4 is initiated.

Program segment 88 selects the altitude of ray path endpoint in the current atmospheric layer involved in the calculation and which calculation is dependent upon the ray traveling up, down, or turning within the atmospheric layer involved in the calculation. Program segment 88 then initiates program segment 90 which is a decisional block and determines if the sound ray exits the top of the defined layer of the atmosphere involved in the calculation. If the answer is NO, program segment 90 initiates program segment 92.

Program segment 92 calculates the endpoint of the ray in the current atmospheric layer, i.e., it defines the endpoints $(X_2,Y_2,Z_2)$ and time $(T_2)$. Program segment 92 then initiates program segment 94.

Program segment 94 is a decisional block and determines if the ray intersects within the plane of the topography of the site of interest. If the answer is NO, program segment 94 initiates program segment 96.

Figure 4:
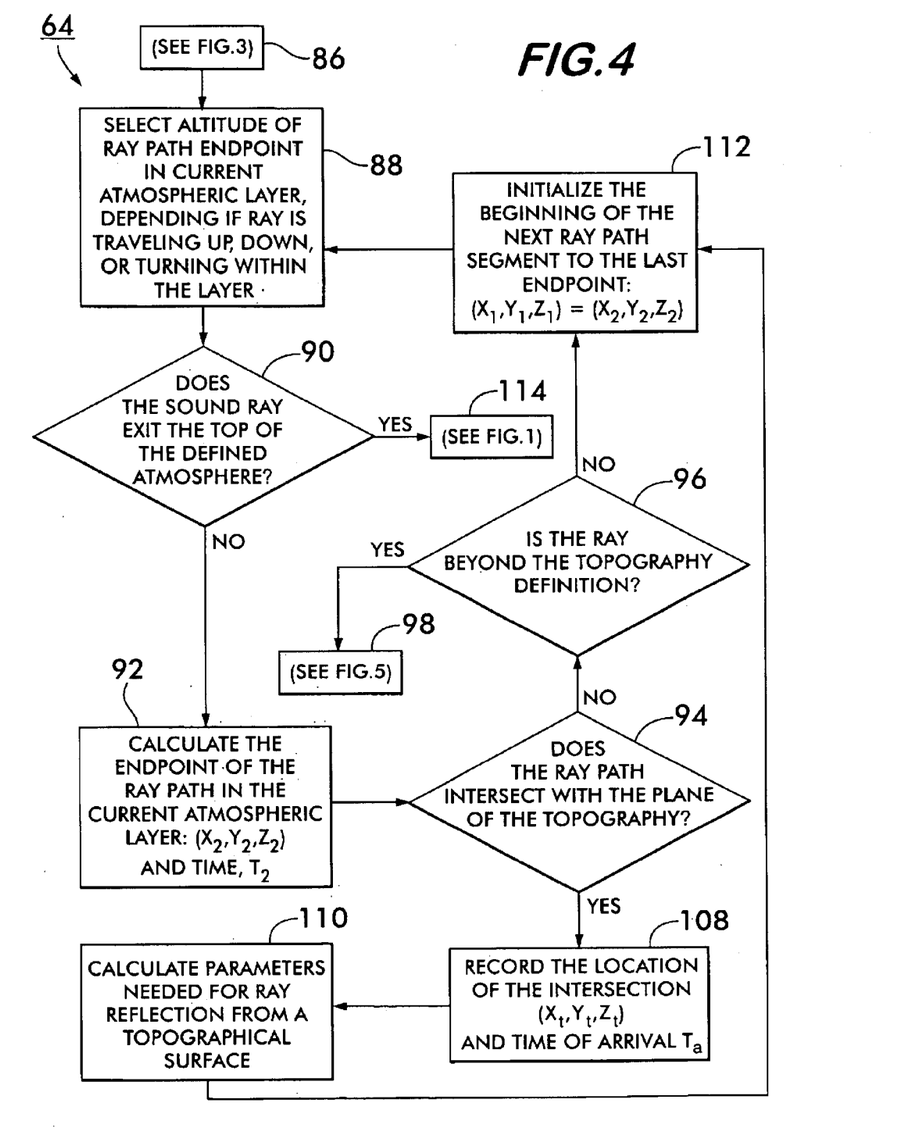
Figure 5:
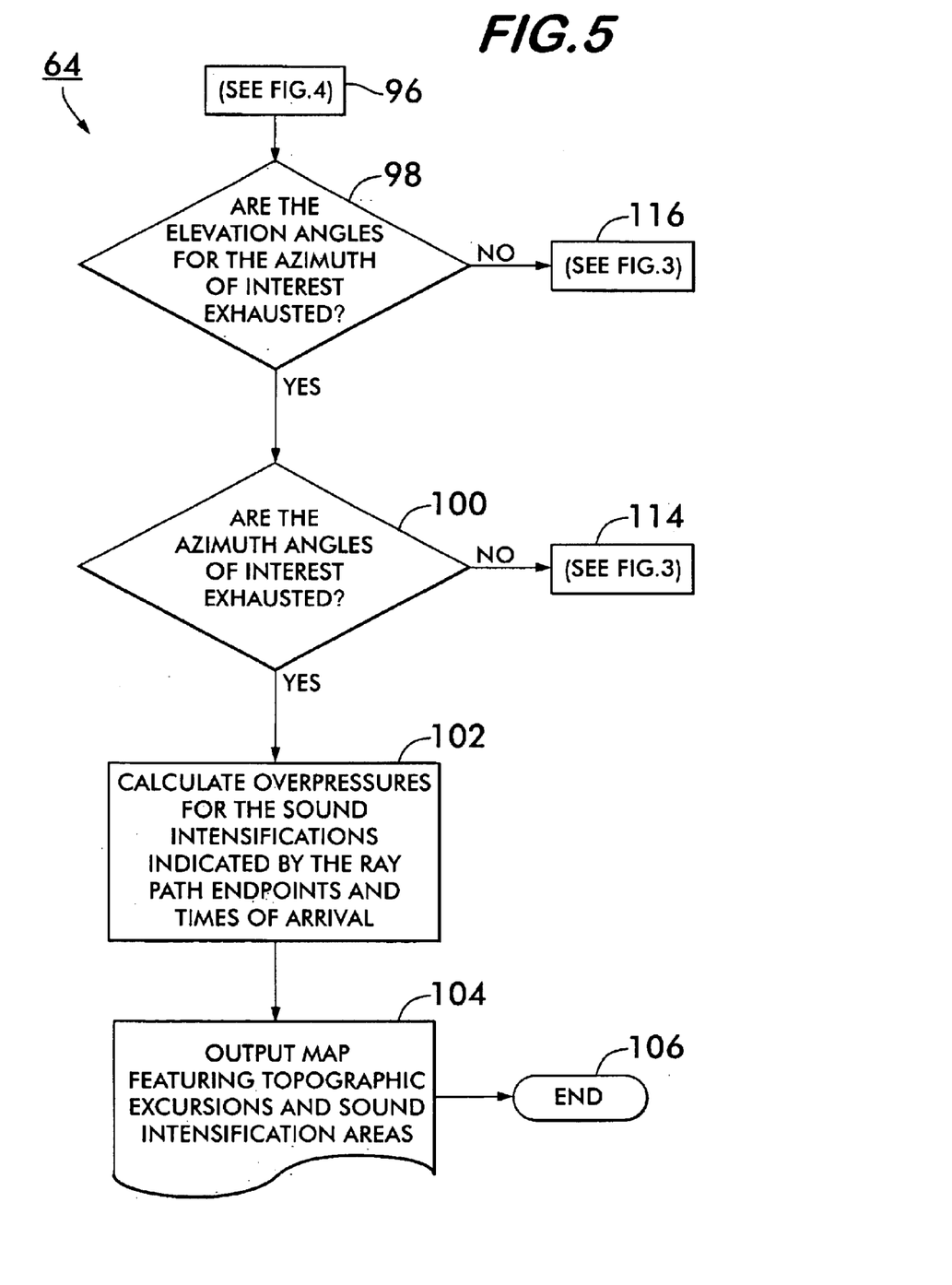

Program segment 96 is also a decisional block and determines if the ray is beyond the topographical definition defined by the input topographical description and, if the answer is YES, program segment 96 initiates program segment 98 shown in FIG. 5.

Program segment 98 is also a decisional block and determines if the elevation angles of the azimuth of interest, that is, the azimuths associated with the site of interest involved with the predictions being performed by the SIPS program by 64 have been exhausted, and, if the answer is YES, program segment 98 initiates program segment 100.

Program segment 100 determines if the azimuth angles of the azimuth of interest have been exhausted and, if the answer is YES, program segment 100 passes control to program segment 102.

Program segment 102 calculates the overpressure for the sound intensifications indicated by the calculated ray path endpoints and the time of arrival and then initiates program segment 104.

Program segment 104 provides an output map on display means 14 of FIG. 1 featuring topographic excursions and sound intensification areas. Upon completion of program segment 104, program segment 106 is initiated, which is the end or the termination point of the SIPS program segment 64.

With reference back to FIG. 4 and, in particular, to program segment 94, if the ray path does intersect the plane of topography then program segment 94 initiates program segment 108.

Program segment 108 records a location of the intersection of $(X_r,Y_r,Z_r)$ and the time of arrival $T_a$ of the ray. Upon completion, program segment 108 initiates program segment 110.

Program segment 110 calculates the parameters needed for ray reflection from a topographical surface. In the SIPS program 64 the acoustic rays are allowed to reflect from topography facets that are encountered to simulate the real reflection of low-frequency sound from water or ground surfaces. New values $(k'_1,k'_2)$ will be recomputed because the ray will now be treated as beginning from an altitude different from the original Z=h with a new set of initial angles $(\phi,\theta)$. The process of reflection will entail another coordinate rotation until the ray is either reflected again or terminated. The next ray will revert to calculations inside the (X,Y,Z) system. Upon completion, program segment 110 initiates program segment 112.

Program segment 112 initializes the beginning of the next ray path segment to the last endpoints, that is: $(X_1,Y_1,Z_1)$= $(X_2,Y_2,Z_2)$. Upon completion, program segment 112 passes control to program segment 88 which, in turn, proceeds in a manner as previously described.

Again with reference back to FIG. 4 and, in particular, to program segment 96, if the decision of program segment 96 is that the ray is not beyond the topographical definition of the site of interest concerned with the calculations and predictions being performed by the SIPS program 64, then program segment 96 passes control to program segment 112, which, in turn, operates in a manner as previously described.

With reference to FIG. 4, if the answer of decisional segment 90 is YES, that is, the sound ray does exit the top of the defined layer of atmosphere involved in calculation, then program segment 104 of FIG. 3 is initiated. Similarly, with reference to FIG. 5 and, in particular, decisional program segment 100, if the answer of program segment 100 is NO, i.e., the azimuth angles associated with the site of interest have not been exhausted, the program segment 104 is initiated.

Program segment 114 increments the next azimuth angle in response to the qualification to the output of program segment 90 of FIG. 4 and program segment 100 of FIG. 5 and then passes control to program segment 82, previously described.

With reference to FIG. 5 and, in particular, to decisional program segment 98, if the answer to program segment 98 is NO, that is, the elevation angles for the azimuth of interest of the site of interest have not been exhausted, program segment 116 of FIG. 3 is initiated.

Program segment 116 increments to the next elevation angle for the azimuth of interest in response to the qualification of an output of program segment 98 of FIG. 5 and then passes control to program segment 84 (previously discussed).

It should now be appreciated that the practice of the present invention provides for a system, and a method of operation thereof, for predicting the location of noise and intensification zones and quiet zones created by a noise event emanating from a site of interest and generating acoustic rays. The present invention also takes into account the cross wind effects on the path of the acoustic rays through each atmospheric layer involved in the calculations and predictions, as well as taking into account that the area of interest as having a stationary origin or one in which the origin may be moving.

What is claimed is:

1. A method for predicting the location of noise intensification zones and quiet zones created by a noise event emanating from a site of interest and generating acoustic rays, said method comprising the steps of:

collecting meteorological data at upper atmospheric layers over the site of interest, said meteorological data including temperatures, wind speeds, and wind directions at the altitude at each of said atmospheric layers;

obtaining topological data representing a topographical description of the site of interest; and tracing and calculating the propagation of the acoustic rays through each atmospheric layer as a function of the altitude and taking into account the cross wind effect on said acoustic rays at each atmospheric layer responsive to the collected meteorological data and the topographical data.

2. The method according to claim 1, wherein the tracing and calculating step takes into account a noise event moveable within said site of interest.

3. A method for predicting the location of noise intensification zones and quiet zones created by a noise event emanating from a site of interest and generating acoustic rays by collecting meteorological data at upper atmospheric layers over the site of interest, the meteorological data including temperatures, wind speeds, and wind directions at the altitude at each of the atmospheric layers and obtaining topographical data corresponding to a topological description of the site of interest to thereby permit tracing and calculating the propagation of the acoustic rays through each atmospheric layer as a function of the altitude and taking into account the cross wind effect on the acoustic rays at each atmospheric layer responsive to the collected meteorological data and the topographical data, the method comprising:

a) inputting meteorological data collected at upper atmospheric layers over the said site of interest for use in calculating the paths of said acoustic rays;

b) inputting coordinates for said topographical description of said site of interest for use in calculating the plane of the topograph;

c) calculating the speed of sound in each upper level of the atmospheric meteorological data;

d) rotating the coordinate system used for calculating the paths of said acoustic rays so that wind vector at said noise event altitude is aligned along the rotated X-axis;

e) calculating east-west (x) and north-south (y) components of wind speed at each atmospheric level in the said rotated coordinate system;

f) calculating the sound speed and wind component gradients within each atmospheric layer;

g) initializing the azimuth angle to begin the calculations of the paths of acoustic rays;

h) initializing the elevation angle to begin the calculations of the paths of the acoustic rays;

i) calculating the parameters $k_1, k_2$ for the acoustic ray being traced;

j) setting ray path origin $(X_1, Y_1, Z_1)$ at the noise event at time $(T_1)=0$;

k) selecting the altitude of ray path endpoint in the atmospheric layer being calculated depending if ray is traveling up, down, or turning within the atmospheric layer being calculated;

l) determining if the sound ray exits the top of a defined layer of atmosphere being calculated;

m) calculating the endpoint of the ray path in the atmospheric layer being calculated to determine: $(X_2, Y_2, Z_2)$ and time, $T_2$;

n) determining if the ray path does not intersect with the plane of the topography;

o) determining if the ray is beyond the topography plane defined by the input topographical description;

p) calculating overpressures for the sound intensifications indicated by the calculated ray path endpoints and times of arrival; and q) outputting a map featuring topographic excursions and sound intensification areas.

4. The method according to claim 3, wherein said step g is repeated if step l of claim 3 determines that the sound ray being calculated exits the top of the defined layer of the atmosphere being calculated and after incrementing the azimuth angle to correspond the second acoustic ray having its path traced.

5. The method according to claim 3, further comprising the steps $n_1$, $n_2$ and $n_3$ interposed between steps n) and k) if step n) determines that the ray path does intersect the plane of the topograph of said site of interest:

$n_1$) recording the location of the intersection $(X_t, Y_t, Z_t)$ and time of arrival Ta;

$n_2$) calculating the parameters needed for ray reflection from a topographical surface; and $n_3$) initializing the beginning of the next ray path segment to the last endpoint: $(X_1, Y_1, Z_1)=(k_2, Y_2, Z_2)$.

6. The method according to claim 5, further comprising repeating step $n_3$ if step 0) determines that the ray is not beyond the topography of the site of interest that is defined by the input topographical description.

7. The method according to claim 6, further comprising the steps $0_1$ and $0_2$ interposed between steps 0) and p):

$0_1$) determining if the elevation angles for the azimuth of interest are exhausted and, if not, increment the elevation angle to correspond to the second acoustic ray having its path traced and then repeating the steps of claims 3, 4, 5, and 6 starting with step i) of claim 3; and $0_2$) determining if the azimuth angles of interest are exhausted and, if not, repeating the steps defined by claim 4.

8. A Sound Intensity Prediction System (SIPS) for predicting the intensity of sound created by a noise event generating acoustic rays at a site of interest comprising:

a system for collecting meteorological data at upper atmospheric layers over said site of interest, said meteorological data including temperatures, wind speeds and wind directions at the altitude of each of said atmosphere layers;

a system for generating the description of the topography of the site of interest;

a processor receiving said meteorological data and said description of the topograph of said site of interest and providing the tracing of the propagation of the acoustic rays through each atmospheric layer as a function of the altitude and taking into account the cross wind effect on said acoustic rays at each atmospheric layer; and a system for displaying a map of the area surrounding the site of interest showing the location of sound concentrations and quiet areas.

9. Software for converting a general purpose computer system including a processor in a sound intensity prediction system (SIPS), comprising:

a first data reception segment receiving meteorological data at upper atmospheric layers over the site of interest, said meteorological data including temperatures, wind speeds, and wind directions at the altitude at each of said atmospheric layers;

a second data reception segment receiving topographical data corresponding to a topographical description of the site of interest; and a program for tracing and calculating the propagation of the acoustic rays through each atmospheric layer as a function of the altitude and taking into account the cross wind effect on said acoustic rays at each atmospheric layer responsive to the collected meteorological data and the topographical data.

10. The software as recited in claim 9, wherein program further comprises program segments for implementing respective functions including:

a) a first input segment for inputting meteorological data collected at upper atmospheric layers over the said site of interest for use in calculating the paths of said acoustic rays;

b) a second input segment for inputting coordinates for said topographical description of said site of interest for use in calculating the plane of the topograph;

c) a first calculation segment for calculating the speed of sound in each upper level of the atmospheric meteorological data;

d) a data transform segment for rotating the coordinate system used for calculating the paths of said acoustic rays so that wind vector at said noise event altitude is aligned along the rotated X-axis;

e) a second calculation segment for calculating east-west (x) and north-south (y) components of wind speed at each atmospheric level in the said rotated coordinate system;

f) a third calculation segment for calculating the sound speed and wind component gradients within each atmospheric layer;

g) a first initialization segment for initializing the azimuth angle to begin the calculations of the paths of acoustic rays;

h) a second initialization segment for initializing the elevation angle to begin the calculations of the paths of the acoustic rays;

i) a fourth calculation segment for calculating the parameters $k_1$, $k_2$ for the acoustic ray being traced;

j) a fixing segment for setting ray path origin $(X_1,Y_1,Z_1)$ at the noise event at time $(T_1)=0$;

k) a selection segment for selecting the altitude of ray path endpoint in the atmospheric layer being calculated depending if ray is traveling up, down, or turning within the atmospheric layer being calculated;

l) a first determination segment for determining if the sound ray exits the top of a defined layer of atmosphere being calculated;

m) a fifth calculation segment for calculating the endpoint of the ray path in the atmospheric layer being calculated to determine: $(X_2,Y_2,Z_2)$ and time, $T_2$;

n) a second determination segment for determining if the ray path does not intersect with the plane of the topography;

o) a third determination segment for determining if the ray is beyond the topography plane defined by the input topographical description;

p) a sixth calculation segment for calculating overpressures for the sound intensifications indicated by the calculated ray path endpoints and times of arrival; and q) a display segment for outputting a map featuring topographic excursions and sound intensification areas.

* * * * *